United States Patent
Oshida et al.

(10) Patent No.: US 11,261,911 B2
(45) Date of Patent: Mar. 1, 2022

(54) PROCESSING APPARATUS

(71) Applicant: DISCO CORPORATION, Tokyo (JP)

(72) Inventors: Kunio Oshida, Tokyo (JP); Hiroyuki Hashimoto, Tokyo (JP)

(73) Assignee: DISCO CORPORATION, Tokyo (JP)

(*) Notice: Subject to any disclaimer, the term of this patent is extended or adjusted under 35 U.S.C. 154(b) by 328 days.

(21) Appl. No.: 15/431,293

(22) Filed: Feb. 13, 2017

(65) Prior Publication Data
US 2017/0234365 A1 Aug. 17, 2017

(30) Foreign Application Priority Data
Feb. 17, 2016 (JP) .............................. JP2016-028063

(51) Int. Cl.
*F16C 32/06* (2006.01)
*B24B 41/04* (2006.01)

(52) U.S. Cl.
CPC .......... *F16C 32/0622* (2013.01); *B24B 41/04* (2013.01); *F16C 2322/39* (2013.01)

(58) Field of Classification Search
CPC ... B23Q 1/38; B23Q 1/70; F16C 17/24; F16C 27/063; F16C 27/02; F16C 32/0614; F16C 32/0603; F16C 32/0607; F16C 32/0622; F16C 32/0625; F16C 35/10; F16C 2233/00; B24B 41/04; B24B 41/042; B24B 41/047; B24B 41/0475; B24B 41/053
See application file for complete search history.

(56) References Cited

U.S. PATENT DOCUMENTS

| | | | | |
|---|---|---|---|---|
| 5,356,225 A | * | 10/1994 | Hanes | F16C 29/025 384/100 |
| 6,814,835 B2 | * | 11/2004 | Kim | B24B 37/04 137/47 |
| 2002/0048517 A1 | * | 4/2002 | Sugita | F16N 7/38 417/12 |
| 2008/0081540 A1 | * | 4/2008 | Sato | B24B 37/345 451/28 |

FOREIGN PATENT DOCUMENTS

| | | | | |
|---|---|---|---|---|
| JP | 61149611 A | * | 7/1986 | ............. F16C 17/24 |
| JP | 2007223014 A | * | 9/2007 | .......... F16C 32/0603 |
| JP | 2010-052057 | | 3/2010 | |
| JP | 2010-173002 | | 8/2010 | |

* cited by examiner

*Primary Examiner* — Joel D Crandall
(74) *Attorney, Agent, or Firm* — Greer, Burns & Crain, Ltd.

(57) ABSTRACT

A processing apparatus includes a processing unit. The processing unit includes a spindle, a spindle housing having an air bearing for rotatably supporting the spindle by using air, and a tool mounted on the front end of the spindle. The spindle housing has an air supply passage for supplying air to the air bearing, an air supply port connected to the air supply passage, an air discharge passage, and an air discharge port. The air supply port is connected through an air supply line to an air source. The air supply line is provided with a pressure gauge and a flowmeter. A first allowable value is previously set for the pressure to be detected by the pressure gauge, and a second allowable value is previously set for the flow rate to be detected by the flowmeter.

14 Claims, 4 Drawing Sheets

PROCESSING APPARATUS

BACKGROUND OF THE INVENTION

Field of the Invention

The present invention relates to a processing apparatus including a chuck table for holding a workpiece and processing means for processing the workpiece held on the chuck table.

Description of the Related Art

A plurality of devices such as integrated circuits (ICs) and large-scale integrations (LSIs) are formed on the front side of a wafer so as to be separated from each other by a plurality of division lines. The back side of the wafer thus having the devices on the front side is ground by a grinding apparatus to thereby reduce the thickness of the wafer to a predetermined thickness. Thereafter, the wafer is divided into individual device chips by a dicing apparatus. The device chips thus obtained are used in electrical equipment such as mobile phones and personal computers. The grinding apparatus is composed generally of a chuck table for holding a wafer and grinding means having a rotatable grinding wheel (tool) for grinding the wafer held on the chuck table, whereby the wafer can be thinned to a desired thickness (see Japanese Patent Laid-open No. 2010-052057, for example).

The dicing apparatus is composed generally of a chuck table for holding a wafer and cutting means having a rotatable cutting blade (tool) for cutting the wafer held on the chuck table, whereby the wafer can be divided into individual device chips with high accuracy (see Japanese Patent Laid-open No. 2010-173002, for example).

SUMMARY OF THE INVENTION

Each of the grinding means and the cutting means includes a spindle for mounting the tool and an air bearing adapted to be supplied with high-pressure air, thereby supporting the spindle in a noncontact condition. That is, the spindle is rotatably supported by the air bearing in the condition where frictional resistance is almost zero, so that vibrations are suppressed to allow high-precision grinding and cutting. However, in the case that external dust, water, etc. may enter an air supply passage for supplying the high-pressure air to the air bearing or an air discharge passage for discharging the air from the air bearing or in the case that the air supply passage or the air discharge passage may be clogged with foreign matter such as water generated due to a change in pressure or temperature, the high-pressure air cannot be sufficiently supplied to the air bearing. As a result, the noncontact condition of the spindle cannot be maintained to cause the occurrence of galling in the air bearing, so that there is a possibility of damage to the grinding means and the cutting means. Further, also in the case that air leakage has occurred in the air supply passage or the air discharge passage, a similar problem is caused.

It is therefore an object of the present invention to provide a processing apparatus which can prevent the occurrence of galling in an air bearing for supporting a processing tool.

In accordance with an aspect of the present invention, there is provided a processing apparatus including a chuck table for holding a workpiece and processing means for processing the workpiece held on the chuck table. The processing means includes a spindle; a spindle housing for rotatably supporting the spindle, the spindle housing having an air supply passage, an air supply port connected to the air supply passage, an air discharge passage, and an air discharge port connected to the air discharge passage; an air bearing defined between the spindle and the spindle housing, the air bearing communicating with the air supply passage and the air discharge passage to support the spindle by using high-pressure air; a tool mounted on the front end of the spindle; a high-pressure air source for supplying the high-pressure air; an air supply line for connecting the high-pressure air source to the air supply port; a pressure gauge provided on the air supply line for detecting the pressure of the high-pressure air in the air supply line; and a flowmeter provided on the air supply line for detecting the flow rate of the high-pressure air in the air supply line. A first allowable value is previously set for the pressure to be detected by the pressure gauge, and a second allowable value is previously set for the flow rate to be detected by the flowmeter.

Preferably, when the pressure detected by the pressure gauge has deviated from the first allowable value or the flow rate detected by the flowmeter has deviated from the second allowable value, a warning is given to an operator. In particular, when the pressure detected by the pressure gauge is maintained at the first allowable value and the flow rate detected by the flowmeter has become less than the second allowable value, abnormality that the air supply passage or the air discharge passage has been clogged with foreign matter is informed as the warning. Further, when the pressure detected by the pressure gauge is maintained at the first allowable value and the flow rate detected by the flowmeter has become greater than the second allowable value, abnormality that air leakage has occurred in the air supply passage or the air discharge passage is informed as the warning.

According to the present invention, the air to be supplied from the air source to the air bearing is managed not only according to the pressure detected by the pressure gauge, but also according to the flow rate detected by the flowmeter. Accordingly, in the event that the pressure of the air to be supplied to the air bearing is maintained at a desired pressure, but the flow rate of the air to be supplied to the air bearing is insufficient because the air supply passage or the air discharge passage is clogged with foreign matter such as water, possible galling in the air bearing can be predicted to thereby prevent damage to the processing means having the air bearing, such as grinding means and cutting means.

Further, when the pressure detected by the pressure gauge has deviated from the first allowable value or the flow rate detected by the flowmeter has deviated from the second allowable value, a warning is given to an operator. In particular, when the pressure detected by the pressure gauge is maintained at the first allowable value and the flow rate detected by the flowmeter has become less than the second allowable value, it is determined that the air supply passage or the air discharge passage has been clogged with foreign matter, and this abnormality is informed as the warning. As another case, when the pressure detected by the pressure gauge is maintained at the first allowable value and the flow rate detected by the flowmeter has become greater than the second allowable value, it is determined that air leakage has occurred in the air supply passage or the air discharge passage, and this abnormality is informed as the warning.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
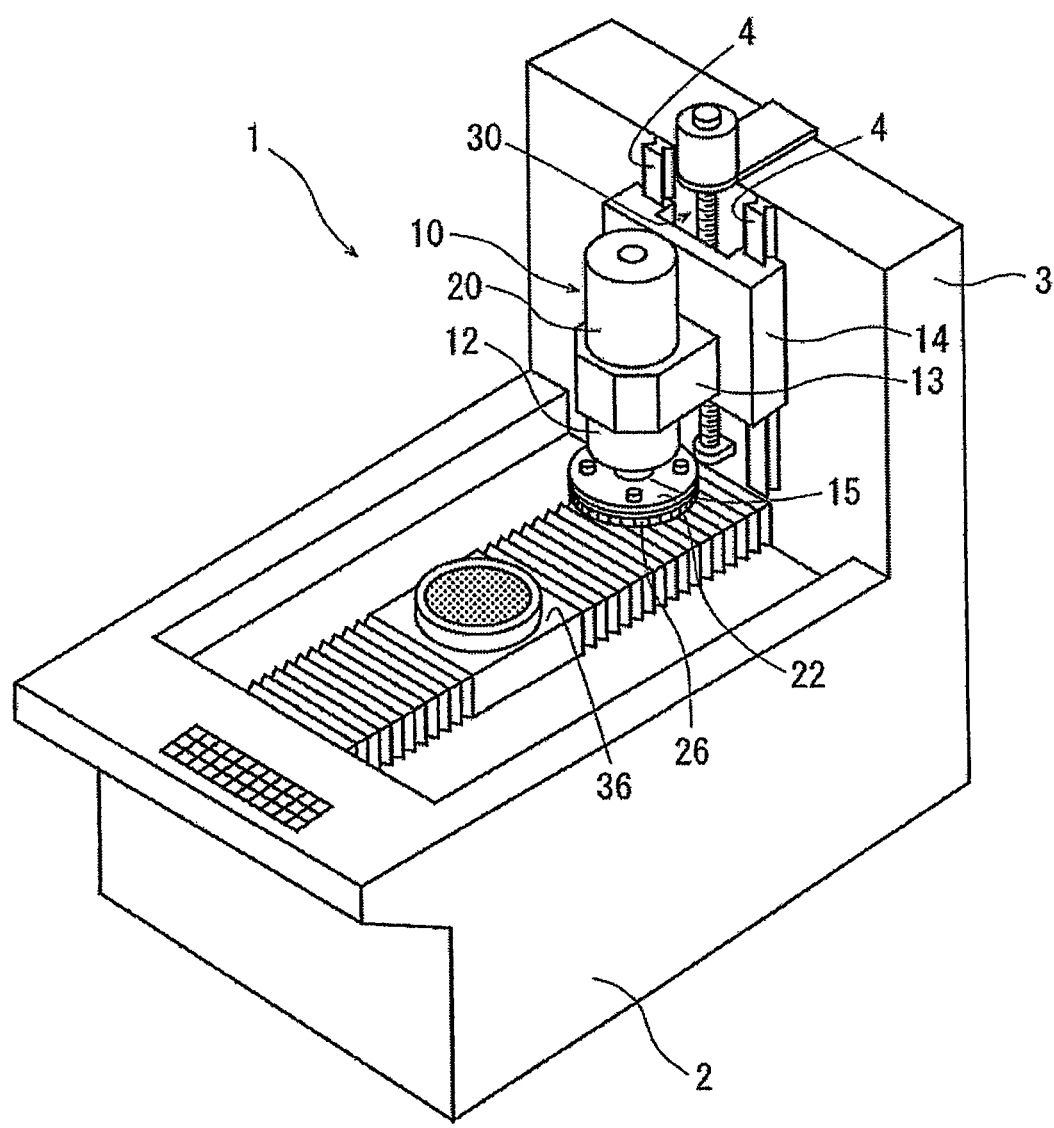
FIG. 1 is a general perspective view of a grinding apparatus according to a preferred embodiment of the present invention.

A preferred embodiment of the processing apparatus according to the present invention will now be described in detail with reference to the attached drawings. FIG. 1 is a general perspective view of a grinding apparatus 1 according to a first preferred embodiment of the present invention, wherein the grinding apparatus 1 includes processing means according to the present invention. As shown in FIG. 1, the grinding apparatus 1 includes a stationary base 2 and a column 3 extending upward from the rear end of the stationary base 2. A pair of guide rails 4 extending vertically are fixed to the column 3.

The grinding apparatus 1 includes a grinding unit 10 as the processing means. The grinding unit 10 has a spindle housing 12 and a support member 13 for supporting the spindle housing 12. The support member 13 is mounted on a moving base 14 vertically movable along the guide rails 4. Accordingly, the grinding unit 10 (grinding means) is vertically movable by the movement of the moving base 14.

The grinding unit 10 includes a spindle 15 rotatably supported in the spindle housing 12, a servo motor 20 for rotationally driving the spindle 15, a wheel mount 22 fixed to the lower end of the spindle 15, and a grinding wheel 24 detachably mounted on the wheel mount 22. The grinding wheel 24 is composed of a base and a plurality of abrasive members 26 fixed to the lower surface of the base so as to be arranged annularly.

The grinding apparatus 1 further includes a grinding unit feeding mechanism 30 for vertically moving the grinding unit 10 along the guide rails 4. The grinding unit feeding mechanism 30 is composed of a ball screw and a pulse motor for rotating the ball screw. The ball screw of the grinding unit feeding mechanism 30 is threadedly engaged with the moving base 14. Accordingly, when the pulse motor of the grinding unit feeding mechanism 30 is operated, the ball screw is rotated to thereby vertically move the moving base 14. A chuck table mechanism 36 as holding means for holding a workpiece is provided on the upper surface of the stationary base 2. The chuck table mechanism 36 is movable by a moving mechanism (not shown) to selectively take a standby position where a wafer as a workpiece is loaded or unloaded and a grinding position where the wafer is ground by the grinding unit 10. That is, the standby position is set apart from the grinding unit 10, and the grinding position is set directly below the grinding unit 10.

Figure 2:
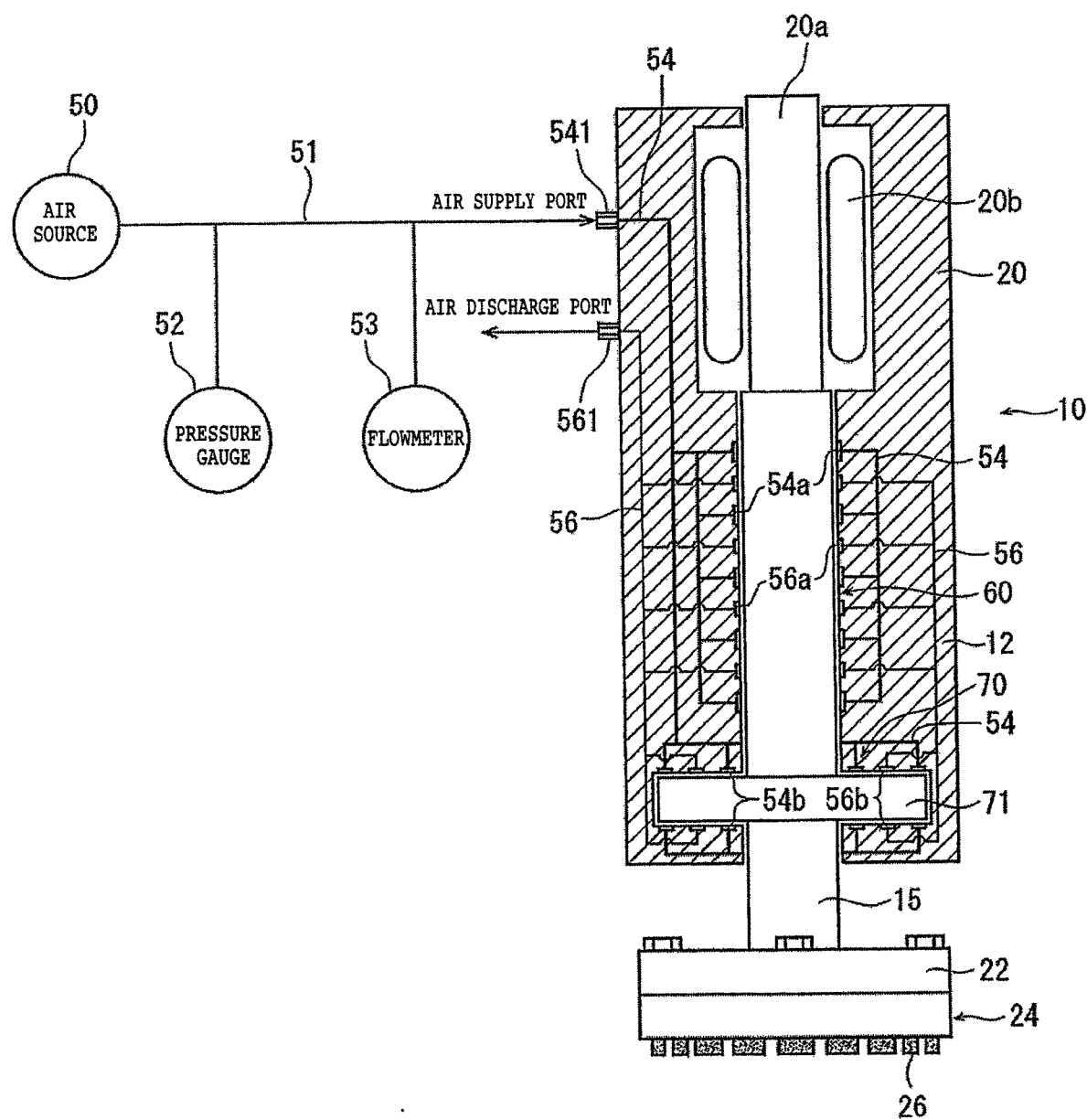
FIG. 2 is a vertical sectional view of a grinding unit included in the grinding apparatus shown in FIG. 1.

FIG. 2 is a vertical sectional view of the grinding unit 10, which has an air supply passage 54 and an air discharge passage 56. The spindle 15 is supported along the center line of the spindle housing 12 of the grinding unit 10. The spindle 15 is integrally formed with a disk-shaped thrust plate 71. The spindle housing 12 is formed with a radial air bearing 60 for supporting the spindle 15 (shaft portion) in its radial direction by using air and a thrust air bearing 70 for supporting the thrust plate 71 of the spindle 15.

An air supply port 541 and an air discharge port 561 are provided on the outer circumference of the spindle housing 12 of the grinding unit 10. The air supply port 541 is connected to the air supply passage 54 (shown by a heavy line in FIG. 2) formed in the spindle housing 12, and the air discharge port 561 is connected to the air discharge passage 56 (shown by a thin line in FIG. 2) formed in the spindle housing 12. The air supply passage 54 functions to supply high-pressure air from the air supply port 541 to the radial air bearing 60 and the thrust air bearing 70. The air discharge passage 56 functions to discharge the air from the radial air bearing 60 and the thrust air bearing 70 to the air discharge port 561. The air supply port 541 is connected through an external air supply line 51 to an external air source 50. Accordingly, the high-pressure air (0.6 MPa, for example) is supplied from the air source 50 through the air supply line 51 to the air supply port 541 and then supplied through the air supply passage 54 to the air bearings 60 and 70. Thereafter, the air from the air bearings 60 and 70 is discharged through the air discharge passage 56 to the air discharge port 561 and then discharged from the air discharge port 561 to the outside of the spindle housing 12.

The air supply passage 54 formed in the spindle housing 12 is branched into a first portion connected to the radial air bearing 60 and a second portion connected to the thrust air bearing 70. The first portion of the air supply passage 54 is further branched into plural portions connected to respective plural air inlets 54a formed in the radial air bearing 60. The radial air bearing 60 is further formed with plural air outlets 56a connected to the air discharge portion 56. On the other hand, the second portion of the air supply passage 54 is further branched into plural portions connected to respective plural air inlets 54b formed in the thrust air bearing 70. The thrust air bearing 70 is further formed with plural air outlets 56b connected to the air discharge passage 56. Accordingly, the high-pressure air introduced from the air supply port 541 is supplied through the first portion of the air supply passage 54 to the radial air bearing 60 and then allowed to enter the radial air bearing 60 from the air inlets 54a. Thereafter, the air is allowed to exit from the air outlets 56a and then sent through the air discharge passage 56 to the air discharge port 561. Similarly, the high-pressure air introduced from the air supply port 541 is also supplied through the second portion of the air supply passage 54 to the thrust air bearing 70 and then allowed to enter the thrust air bearing 70 from the air inlets 54b. Thereafter, the air is allowed to exit from the air outlets 56b and then sent through the air discharge passage 56 to the air discharge port 561.

In the radial air bearing 60 and the thrust air bearing 70, a high-pressure air layer having a very small thickness (e.g., 5 to 10 μm) is formed by the high-pressure air supplied from the air inlets 54a and 54b, so that the spindle 15 is supported in a noncontact condition by the air bearings 60 and 70 in the spindle housing 12. Accordingly, the spindle 15 can be rotated stably at high speeds with very low resistance. The servo motor 20 for rotationally driving the spindle 15 is formed at the upper end of the spindle 15, wherein the servo motor 20 is composed of a stator 20a and a rotor 20b.

The air source 50 is adapted to supply high-pressure air to a plurality of various apparatuses at a working site such as a factory where the processing apparatus according to this preferred embodiment is located. Even when the amount of the high-pressure air to be consumed in each apparatus is somewhat changed, a substantially constant air pressure can be maintained, so that the spindle 15 can be stably supported.

The air supply line 51 for supplying high-pressure air from the air source 50 to the grinding unit 10 is provided with a pressure gauge 52 for detecting the pressure of the high-pressure air flowing in the air supply line 51 and a flowmeter 53 for detecting the flow rate of the high-pressure air flowing in the air supply line 51. The pressure detected by the pressure gauge 52 and the flow rate detected by the flowmeter 53 are output as a pressure signal and a flow rate signal, respectively, to control means which will be hereinafter described.

Figure 3:
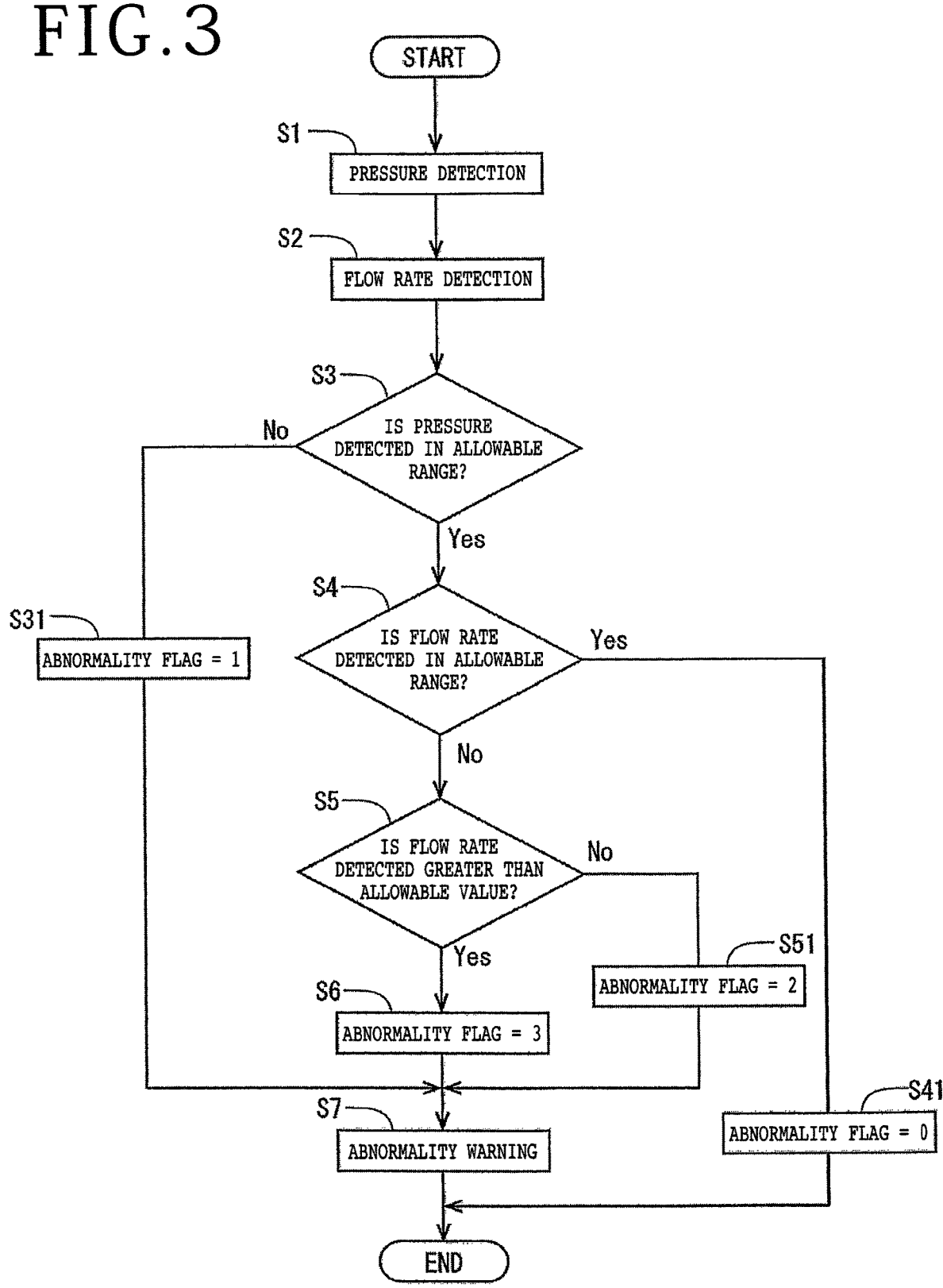
FIG. 3 is a flowchart for illustrating a program to be executed according to the present invention.

The grinding apparatus 1 in this preferred embodiment includes control means (not shown), which is configured by a computer. The control means includes a central processing unit (CPU) for performing operational processing according to a control program, a read only memory (ROM) preliminarily storing the control program, a random access memory (RAM) for storing the results of computation etc., an input interface, and an output interface. A pressure signal from the pressure gauge 52 provided on the air supply line 51 and a flow rate signal from the flowmeter 53 provided on the air supply line 51 are input into the input interface of the control means. Although not shown, the servo motor 20 is provided with a rotational speed sensor and an acceleration sensor. Output signals from the rotational speed sensor and the acceleration sensor are also input into the input interface of the control means. On the other hand, a control signal is output from the output interface of the control means to the servo motor 20, and a warning signal to an operator is also output from the output interface of the control means. A program based on a flowchart shown in FIG. 3 is previously stored in the read only memory (ROM) of the control means. This program is repeatedly executed at given time intervals during the processing of the workpiece by the grinding apparatus 1, and the processed condition of the workpiece is monitored.

The operation of the grinding apparatus 1 having the above configuration will now be described. When the wafer (not shown) is placed on the chuck table mechanism 36 as holding means in the grinding apparatus 1 shown in FIG. 1, the control means outputs a control signal of applying electric power to the stator 20a of the servo motor 20. As a result, the spindle 15 connected to the rotor 20b of the servo motor 20 is rotated, thus obtaining a standby condition where predetermined grinding can be performed by the abrasive members 26 of the grinding wheel 24 mounted on the spindle 15. In supplying the electric power to the servo motor 20, high-pressure air is previously supplied from the air source 50 to the grinding unit 10, thereby supporting the spindle 15 in a noncontact condition inside the spindle housing 12.

In the condition where the spindle 15 of the grinding unit 10 is being rotated by supplying the electric power to the servo motor 20, the moving base 14 is lowered along the guide rails 4 until the abrasive members 26 of the grinding wheel 24 come into contact with the work surface (upper surface) of the wafer as a workpiece. Thus, the grinding to the wafer is started and the grinding wheel 24 is further lowered (fed) at a predetermined feed speed to thereby grind the work surface of the wafer. In this grinding operation, the program based on the flowchart shown in FIG. 3 is repeatedly executed at given time intervals, so as to detect any abnormality in the grinding apparatus 1.

When the program is started, the pressure detected by the pressure gauge 52 provided on the air supply line 51 is input into the control means and then stored (step S1). Further, the flow rate detected by the flowmeter 53 is also input into the control means and then stored (step S2).

The control means previously sets and stores an allowable pressure and allowable flow rate of the high-pressure air as allowable in the air bearings 60 and 70 of the grinding unit 10. The allowable pressure and the allowable flow rate are each set so as to have a predetermined allowable range. For example, the allowable pressure is set to 0.5 to 0.6 MPa, and the allowable flow rate is set to 48 to 52 liters/minute in this preferred embodiment. After the pressure and the flow rate detected in the air supply line 51 are input into the control means in steps S1 and S2, it is determined whether or not the pressure detected falls within the range of the allowable pressure (step S3). If the pressure detected falls within the range of the allowable pressure (Yes in step S3), it is determined that the pressure detected is not abnormal and the program then proceeds to the next step, in which it is determined whether or not the flow rate detected by the flowmeter 53 falls within the range of the allowable flow rate (step S4). If the flow rate detected falls within the range of the allowable flow rate (Yes in step S4), the program proceeds to step S41, in which an abnormality flag is set to 0 (i.e., it is determined that the flow rate detected is not abnormal). Then, the program is ended. With the next timing, this program is executed again. At the time this program is initially executed, the abnormality flag is previously set to 0 as initial setting.

If the pressure detected in step S1 does not fall within the range of the allowable pressure (No in step S3), the program proceeds to step S31, in which the abnormality flag is set to 1 and this value is stored into the control means. In this case, the program proceeds to step S7, in which abnormality warning is given to the operator according to the value for the abnormality flag. Examples of this abnormality warning include sounding of a buzzer, indication of the abnormality on a monitor, and lighting of a red lamp. The abnormality of the pressure (abnormality flag=1) of the high-pressure air in the air supply line 51 is assumed to be due to the abnormality of the air source 50, and this abnormality may be indicated on a monitor or the like (e.g., a message of "Supplied air pressure is abnormal").

If the pressure detected falls within the range of the allowable pressure (Yes in step S3), the program proceeds to step S4, in which it is determined whether or not the flow rate detected falls within the range of the allowable flow rate. If the flow rate detected does not fall within the range of the allowable flow rate (No in step S4), the program proceeds to step S5, in which it is determined whether or not the flow rate detected is greater than the allowable flow rate. If the flow rate detected is not greater than the allowable flow rate (No in step S5), it is determined that the flow rate detected is less than the allowable flow rate and the program then proceeds to step S51, in which the abnormality flag is set to 2 and this value is stored into the control means. Thereafter, the program proceeds to step S7, in which abnormality warning (e.g., sounding of a buzzer, indication of the abnormality on a monitor, or lighting of a red lamp) is given to the operator according to the value for the abnormality flag. The answer of No in step S5 (abnormality flag=2) is assumed to be due to the fact that the air supply passage 54 or the air discharge passage 56 is clogged with foreign matter, and this abnormality may be indicated on a monitor or the like (e.g., a message of "Clogging with foreign matter has occurred"). Thus, the warning on the monitor can be visually recognized by the operator.

If the flow rate detected is greater than the allowable flow rate (Yes in step S5), the program proceeds to step S6, in which the abnormality flag is set to 3 and this value is stored into the control means. Thereafter, the program proceeds to step S7, in which abnormality warning (e.g., sounding of a buzzer, indication of the abnormality on a monitor, or lighting of a red lamp) is given to the operator according to the value for the abnormality flag. The answer of Yes in step S5 (abnormality flag=3) is assumed to be due to the fact that air leakage has occurred in the air supply passage 54 or the air discharge passage 56, and this abnormality may be indicated on a monitor or the like (e.g., a message of "Air leakage has occurred"). Thus, the warning on the monitor can be visually recognized by the operator. In the case that the abnormality flag is 1, 2, or 3, the details of the abnormality may be specifically indicated as a warning on a monitor as described above. As a modification, the details of the abnormality may be distinguished according to the colors of a warning lamp attached to the processing apparatus. As another modification, the value for the abnormality flag may be indicated as an error code. Thus, various warning forms may be adopted so that the operator can distinguish the kinds of the abnormality.

As described above, high-pressure air is supplied from an air source having a large capacity to a plurality of apparatuses in a factory or the like. In this case, even when the flow rate of the high-pressure air to be consumed in each apparatus is somewhat changed, the pressure of the high-pressure air to be supplied to each apparatus is maintained at a substantially constant value. Accordingly, in the case that only the pressure detected by a pressure gauge is monitored, there is a possibility that any abnormality such as clogging or air leakage in the air supply passage or the air discharge passage may be missed and the processing means may continue to be used. As a result, the air bearing does not properly function and the spindle housing and the spindle come into contact with each other to cause galling in the air bearing, resulting in possible damage to the air bearing. To the contrary, the processing apparatus according to the present invention includes the flowmeter in addition to the pressure gauge on the air supply line for supplying high-pressure air from the air source to the spindle housing, thereby monitoring both the pressure detected by the pressure gauge and the flow rate detected by the flowmeter. Accordingly, even when the pressure detected by the pressure gauge is maintained in the range of an allowable value, any abnormality in the air supply passage or the air discharge passage can be immediately detected to thereby predict the occurrence of galling and accordingly prevent serious damage to the processing means.

Further, according to the present invention, it is determined whether or not the flow rate detected by the flowmeter is greater than the allowable flow rate. Then, according to the result of this determination, it is possible to distinguish between the leakage of high-pressure air and the clogging of the air supply passage or the air discharge passage. Accordingly, the occurrence of abnormality can be quickly detected and the cause of the abnormality can be easily identified.

Figure 4:
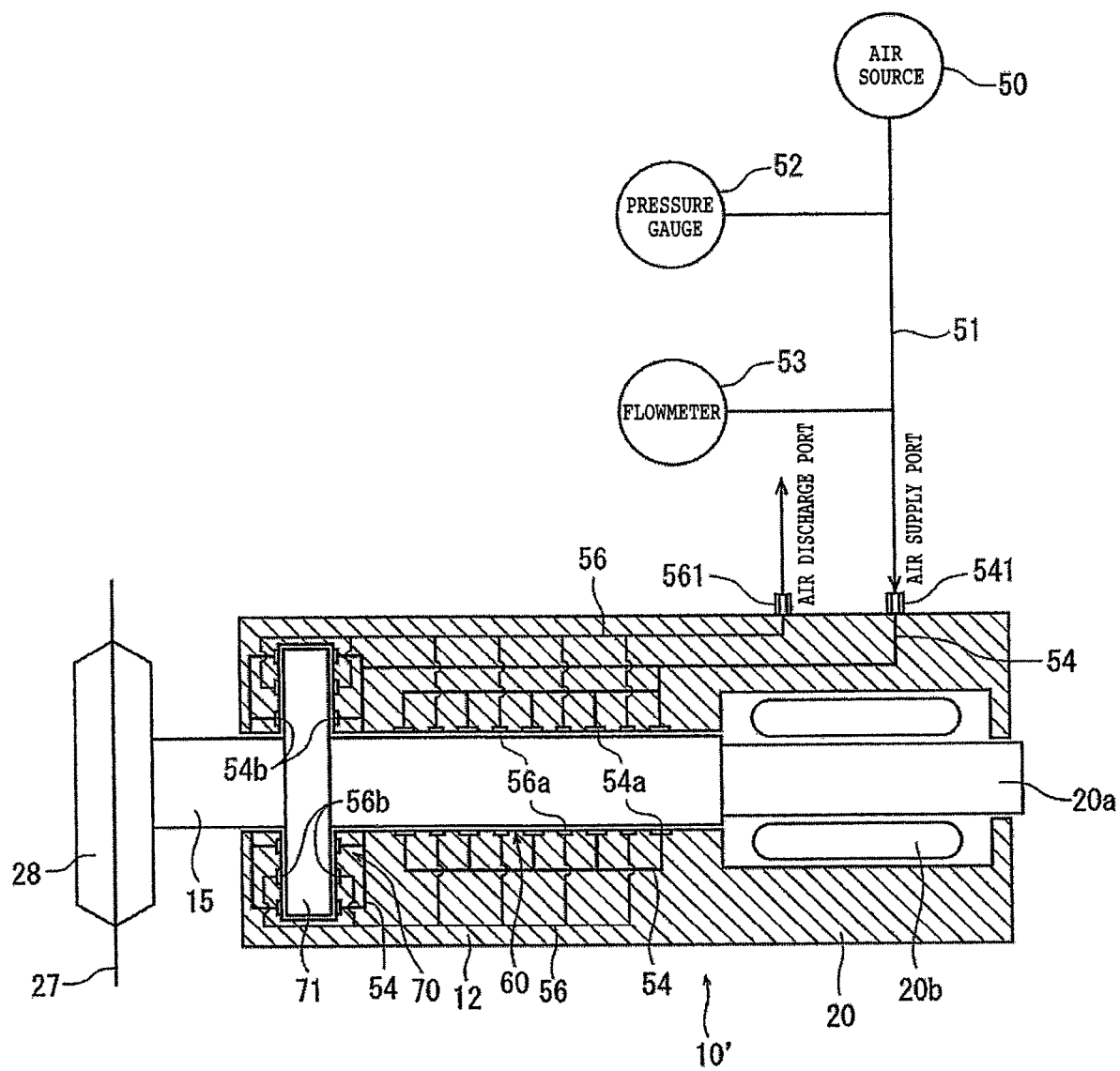
FIG. 4 is a vertical sectional view of a cutting unit as another preferred embodiment of the present invention.

FIG. 4 shows a cutting unit 10' to be used in a cutting apparatus according to a second preferred embodiment of the present invention. More specifically, FIG. 4 is a vertical sectional view of the cutting unit 10', wherein the cutting unit 10' has an air supply passage 54 and an air discharge passage 56, and the air supply passage 54 is connected to an air supply line 51, which is connected to an air source 50 for supplying high-pressure air. In FIG. 4, substantially the same parts as those of the grinding unit 10 shown in FIG. 2 are denoted by the same reference symbols and the detailed description thereof will be omitted herein. The cutting unit 10' includes a spindle 15 and an annular cutting blade 27 held by a flange member 28 at the front end of the spindle 15. In the grinding unit 10 according to the first preferred embodiment shown in FIG. 2, the axis of the spindle 15 extends vertically and movable in the vertical direction as a feeding direction along guide rails 4. In contrast thereto, the cutting unit 10' according to the second preferred embodiment is arranged in the cutting apparatus so that the axis of the spindle 15 extends horizontally.

Thus, in the cutting unit 10' according to the second preferred embodiment, the spindle 15 is so arranged as to extend horizontally. Accordingly, in performing a cutting operation by using the cutting unit 10', the spindle 15 undergoes a maximum load in the direction perpendicular to the axial direction of the spindle 15, that is, in the radial direction of the spindle 15. Accordingly, in the case that any abnormality occurs in the air supply passage 54 or the air discharge passage 56 formed in a spindle housing 20, there is a high possibility that galling may occur in a radial air bearing 60 for supporting the spindle 15 in the radial direction. Also in the second preferred embodiment, the program based on the flowchart shown in FIG. 3 is executed similarly to the first preferred embodiment, wherein abnormality is determined and a warning is then given. Accordingly, the occurrence of abnormality can be quickly detected and the cause of the abnormality can be easily identified.

While the present invention is applied to a grinding apparatus using a grinding wheel as a tool in the first preferred embodiment or applied to a cutting apparatus using a cutting blade as a tool, the present invention is not limited to this configuration. That is, the present invention is applicable to a processing apparatus having any processing means, such as a turning machine and a milling machine, wherein the processing means includes a spindle, a housing having an air bearing for rotatably supporting the spindle by using air, and a tool mounted on the front end of the spindle, the housing including an air supply passage for supplying air to the air bearing, an air supply port connected to the air supply passage, an air discharge passage for discharging air from the air bearing, and an air discharge port connected to the air discharge passage.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A processing apparatus comprising:
 a chuck table for holding a workpiece; and
 processing means for processing said workpiece held on said chuck table;
 said processing means including;
  a spindle,
  a spindle housing for rotatably supporting said spindle, said spindle housing having an air supply passage, an air supply port connected to said air supply passage, an air discharge passage, and an air discharge port connected to said air discharge passage,
  an air bearing defined between said spindle and said spindle housing, said air bearing communicating with said air supply passage and said air discharge passage to support said spindle by using high-pressure air,
  a tool mounted on the front end of said spindle,
  a high-pressure air source for supplying said high-pressure air,
  an air supply line for connecting said high-pressure air source to said air supply port,
  a pressure gauge provided on said air supply line for detecting the pressure of said high-pressure air in said air supply line, and
  a flowmeter provided on said air supply line for detecting the flow rate of said high-pressure air in said air supply line; and a control means in communication with said pressure gauge and said flowmeter, said control means including an output interface and configured to store a designated range of pressure values and a designated range of flow rate values, wherein said control means determines if the pressure of said high-pressure air in said air supply line detected by said pressure gauge is within said designated range of pressure values, and if said flow rate of said high-pressure air in said air supply line detected by said flowmeter is within said designated range of flow rate values, and provides a first warning to the operator when the pressure value detected by said pressure gauge is in the allowable range and the flow rate detected by said flowmeter is greater than said designated range of flow rate values indicating that an air leakage has occurred in said air supply passage or said air discharge passage; and provides a second warning to the operator when the pressure value detected by said pressure gauge is in the allowable range and the flow rate detected by said flowmeter is less than said designated range of flow rate values indicating that one of said air supply passage or said air discharge passage is clogged with foreign matter, wherein said first warning is different from said second warning.

2. The processing apparatus according to claim 1, wherein said designated range of pressure values is 0.5 to 0.6 MPa.

3. The processing apparatus according to claim 2, wherein said designated range of flow rate values is 48 to 52 liters/minute.

4. The processing apparatus according to claim 2, wherein said designated range of flow rate values is 48 to 52 liters/minute.

5. The processing apparatus according to claim 1, wherein said first warning and said second warning includes one of sounding of a buzzer, indicating an abnormality on a monitor, and lighting of a red lamp.

6. The processing apparatus according to claim 1, wherein said spindle is arranged to extend horizontally.

7. The processing apparatus according to claim 1, further comprising providing a third warning to an operator on the output interface when the pressure detected by said pressure gauge is not within said designated range of pressure values, wherein said third warning is different from said first warning and said second warning.

8. The processing apparatus according to claim 1, wherein said first warning is associated with a first visual display and said second warning is associated with a second visual display, and wherein said first visual display is different from said second visual display.

9. The processing apparatus according to claim 8, wherein said first visual display is a first color and said second visual display is a second color.

10. The processing apparatus according to claim 8, wherein said first visual display is a first abnormality flag and said second visual display is a second abnormality flag.

11. A processing apparatus comprising:
a chuck table for holding a workpiece; and
processing means for processing said workpiece held on said chuck table;
said processing means including;
a spindle,
a spindle housing for rotatably supporting said spindle, said spindle housing having an air supply passage, an air supply port connected to said air supply passage, an air discharge passage, and an air discharge port connected to said air discharge passage,
an air bearing defined between said spindle and said spindle housing, said air bearing communicating with said air supply passage and said air discharge passage to support said spindle by using high-pressure air,
a tool mounted on the front end of said spindle,
a high-pressure air source for supplying said high-pressure air,
an air supply line for connecting said high-pressure air source to said air supply port,
a pressure gauge provided on said air supply line for detecting the pressure of said high-pressure air in said air supply line, and
a flowmeter provided on said air supply line for detecting the flow rate of said high-pressure air in said air supply line; and
a control means in communication with said pressure gauge and said flowmeter, said control means including an output interface and configured to store a designated range of pressure values and a designated range of flow rate values, wherein said control means determines if the pressure of said high-pressure air in said air supply line detected by said pressure gauge is within said designated range of pressure values, and if said flow rate of said high-pressure air in said air supply line detected by said flowmeter is within said designated range of flow rate values, wherein said control means:

sets an abnormality flag to one when the pressure of said high-pressure air in said air supply line detected by said pressure gauge is not within said designated range of pressure values;

sets an abnormality flag to two when the pressure of said high-pressure air in said air supply line detected by said pressure gauge is within said designated range of pressure values, and said the flow rate detected by said flowmeter is less than said designated range of flow rate values; and sets an abnormality flag to three when the pressure of said high-pressure air in said air supply line detected by said pressure gauge is within said designated range of pressure values, and said the flow rate detected by said flowmeter is greater than said designated range of flow rate values; and providing a warning to the operator when the control means sets the abnormality flag to one, two or three.

12. The processing apparatus according to claim 11, wherein a first warning is associated with the abnormality flag set to one, a second warning is associated with the abnormality flag set to two and a third warning is associated with the abnormality flag set to three.

13. The processing apparatus according to claim 12, wherein said first warning, said second warning and said third warning are different.

14. The processing apparatus according to claim 12, wherein said first warning is associated with a first color, said second warning is associated with a second color and said third warning is associated with a third color.

* * * * *